United States Patent

[11] 3,594,076

[72] Inventors Gunars Licitis
Lombard;
Norman Kramer, Chicago; Marvin I. Glass, Chicago; Harry Disko, Parks Ridge, all of, Ill.
[21] Appl. No. 735,804
[22] Filed June 10, 1968
[45] Patented July 20, 1971
[73] Assignee Marvin Glass & Associates
Chicago, Ill.

[54] AUDIO-SLIDE PROJECTOR
2 Claims, 12 Drawing Figs.

[52] U.S. Cl. .......... 353/19, 274/4 A, 353/120
[51] Int. Cl. .......... G03b 31/06
[50] Field of Search .......... 353/15, 19, 120; 274/41.4, 43, 4.5

[56] References Cited
UNITED STATES PATENTS
2,973,410 2/1961 Yasushi Hoshino et al... 274/41.4
3,240,117 3/1966 Wickstrom et al. .......... 353/19
FOREIGN PATENTS
1,045,122 11/1958 Germany .......... 353/19

*Primary Examiner*—Leonard Forman
*Assistant Examiner*—Steven L. Stephan
*Attorney*—James F. Coffee

ABSTRACT: A slide projector for projecting individually mounted transparencies and including means for recording and reproducing a sound message on the transparency mounting. The transparency is mounted on a frame of cardboard or the like and a marginal portion of the mounting frame includes a strip of magnetic recording tape. The projector includes a recording and playback unit having a pickup and recording head portion positioned for movement laterally and vertically with respect to the position of the magnetic tape when a mounted transparency is in position for projection.

INVENTORS
GUNARS LICITIS
NORMAN KRAMER
MARVIN I. GLASS
HARRY DISKO

BY James F. Coffee
ATTORNEY

INVENTORS
GUNARS LICITIS
NORMAN KRAMER
MARVIN I. GLASS
HARRY DISKO

BY James F. Coffee
ATTORNEY

INVENTORS
GUNARS LICITIS
NORMAN KRAMER
MARVIN I. GLASS
HARRY DISKO
BY James F. Coffee
ATTORNEY

INVENTORS
GUNARS LICITIS
NORMAN KRAMER
MARVIN I. GLASS
HARRY DISKO

BY James F. Coffee
ATTORNEY

INVENTORS
GUNARS LICITIS
NORMAN KRAMER
MARVIN I. GLASS
HARRY DISKO
BY
ATTORNEY James F. Coffee

INVENTORS
GUNARS LICITIS
NORMAN KRAMER
MARVIN I. GLASS
HARRY DISKO

BY James F. Coffee
ATTORNEY

AUDIO-SLIDE PROJECTOR

BACKGROUND OF THE INVENTION

The combining of sound messages with photographic slides or transparencies has been known heretofore, but such prior devices generally have not been too satisfactory. Such prior art devices have required rather complex and cumbersome equipment, often necessitated special slide-mounting structures, and presented various problems of coordinating the sound with the picture. The present invention is particularly directed to a slide projector which includes sound recording and playback mechanism in a compact and easily portable structure, and which is readily adopted for use with known forms of mounted transparency slides so as to provide a sound message which becomes a permanent part of the mounted slide.

SUMMARY OF THE INVENTION

An audio-slide projector for use with a mounted transparency having a strip of magnetic tape on the mounting and comprising a housing, slide mechanism adapted to move a mounted transparency between a position for projection of the transparency, projection means within the housing, and sound reproducing mechanism within the housing including a pickup head which is movable to engage the magnetic tape portion of the transparency mounting and trace a continuous path thereon.

DESCRIPTION OF THE PREFERRED EMBODIMENT

Figures 1, 2, 3, 11:
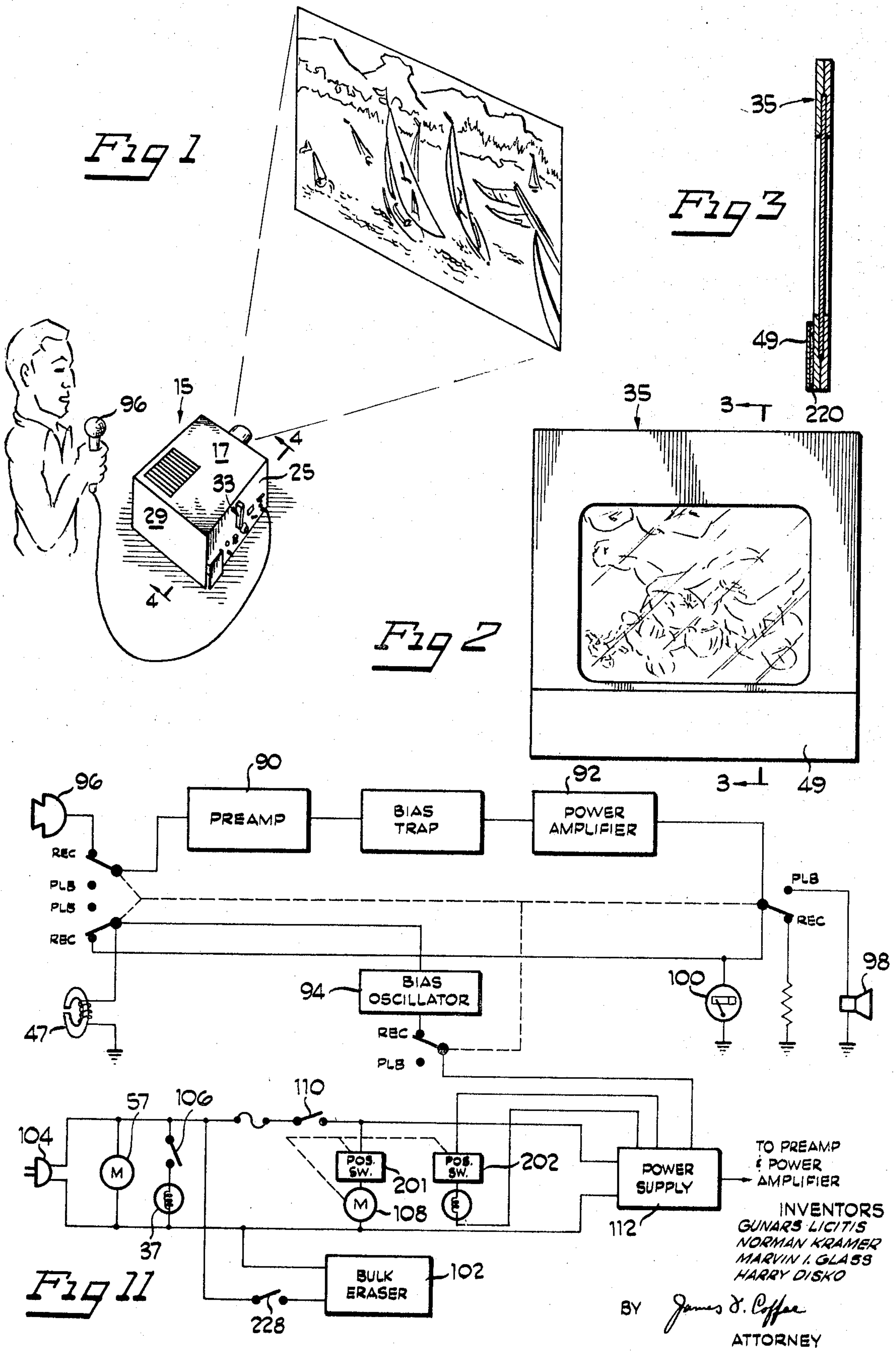
FIG. 1 is a perspective illustration of the slide projector during use.
FIG. 2 is an enlarged front elevational view of a mounted transparency used with the projector.
FIG. 3 is a sectional view taken along the line 3–3 in FIG. 2.
FIG. 11 is a block or functional wiring diagram of the sound recording and reproducing mechanism used in the projector.
Figure 4:
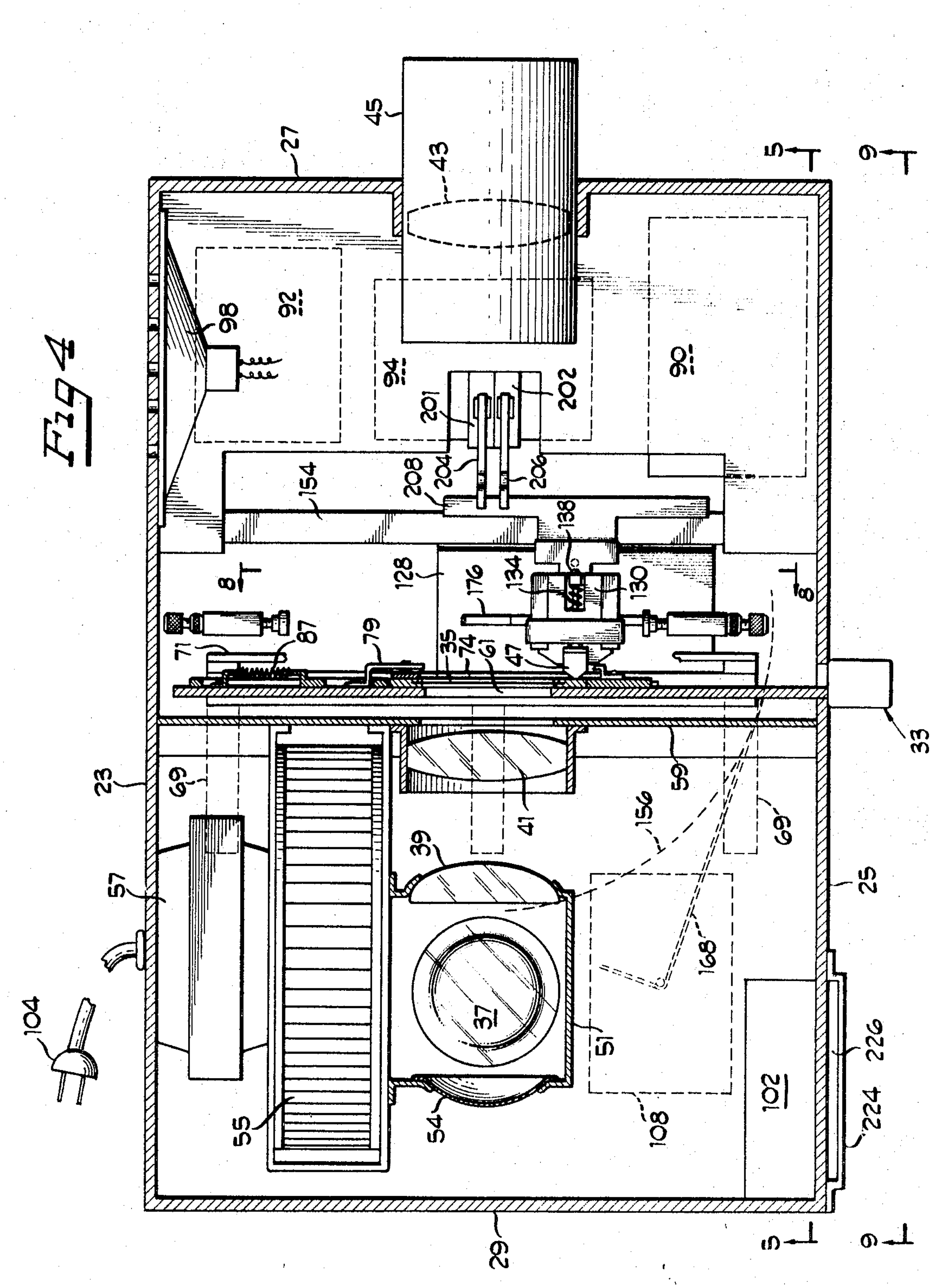
FIG. 4 is an enlarged sectional view of the slide projector, taken generally along the line 4–4 in FIG. 1.
Figure 5:
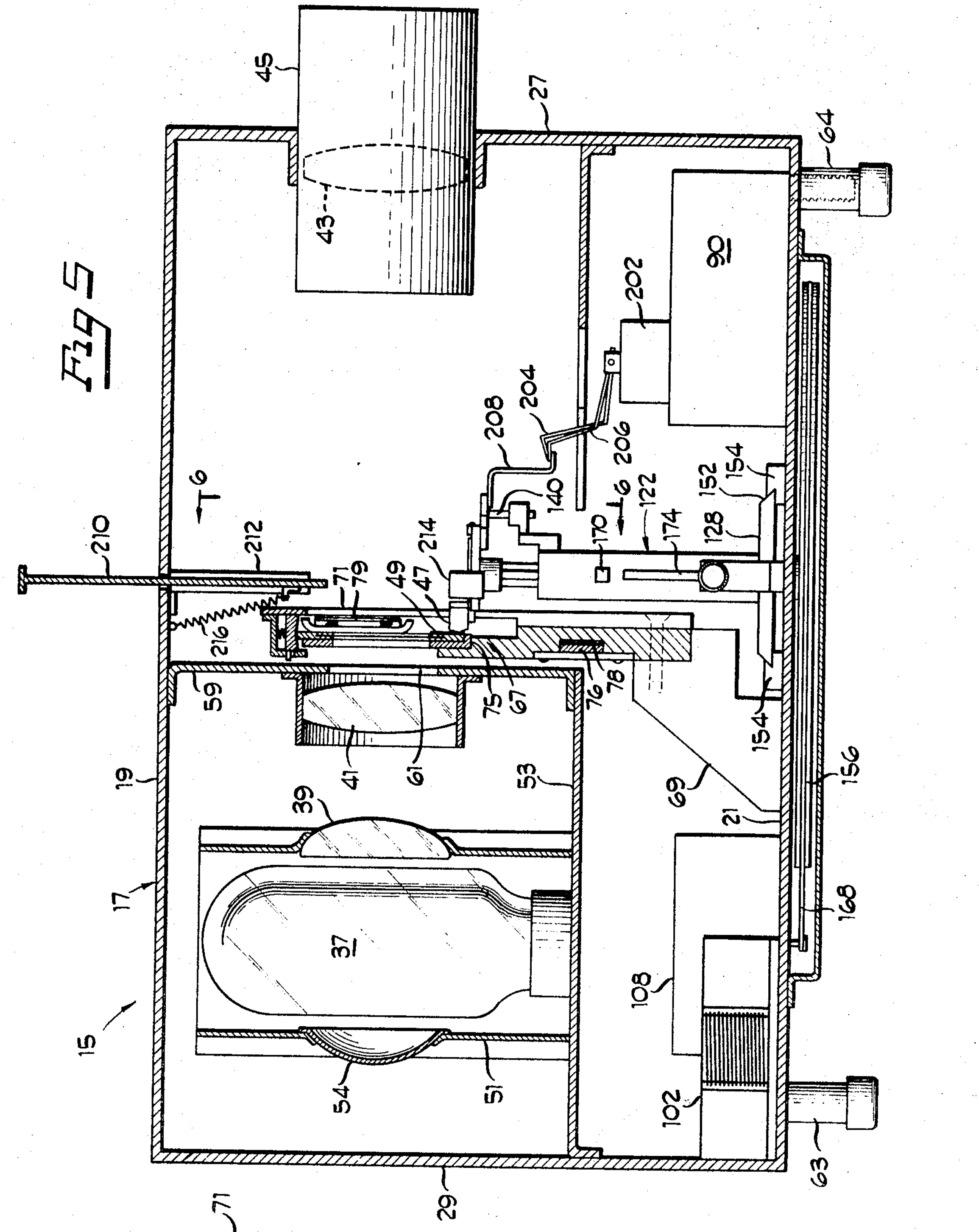
FIG. 5 is a sectional view taken along the line 5–5 in FIG. 4.
Figure 12:
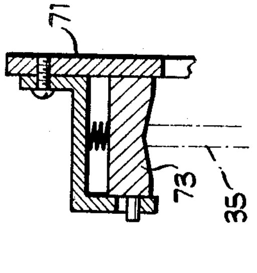
FIG. 12 is an enlarged fragmentary sectional view of structure seen particularly in FIG. 5.

With reference particularly to FIGS. 1–5 of the drawings, it will be seen that the slide projector 15 comprises a generally rectangular housing 17 having a top wall 19, a bottom wall 21, two sidewalls 23, 25 and two end walls 27, 29. Side wall 25 includes the operating controls and is also provided with a slotted opening 31 to accommodate the slide-transporting mechanism 33. The latter functions in the conventional manner and is adapted to receive a mounted transparency or slide 35 at a position outside of the housing and move it to a position within the housing for projection. The slide projection means is also generally conventional in form and includes a high-wattage projection lamp 37, a pair of lenses 39 and 41 disposed between the bulb 37 and the normal position of a transparency disposed within the housing for projection, and a focusing lens 43 mounted in an axially adjustable tubular structure 45 at the front end 27 of the housing 17. The sound recorder and reproducer assembly is principally mounted in the forward portion of housing 17, and the record or pickup head portion 47 of the sound mechanism is positioned below the transparency-receiving opening in the movable slide structure 33 so as not to interfere with the projection of light through the lenses and the transparency.

The lower marginal portion of the transparency mounting is provided with a recording surface, preferably a strip of magnetic tape 49. Transport mechanism is provided for moving the head portion 47 into contact with the magnetic tape 49 and for effecting lateral and vertical motion of the head 47 during operation of the recorder, so as to either record sound on the tape 49 or reproduce a sound message previously recorded thereon. During either the recording or playback operation of the sound reproducing mechanism, the pickup or recorder head 47 is in constant contact with the magnetic tape 49 and moves laterally to and fro within predetermined limits and in a continuous manner. At the end of each lateral stroke, the head 47 moves vertically a relatively small distance before again moving laterally in a line which is parallel to and spaced vertically from the preceding recording line on the tape 49. Consequently, the present invention provides means for positively and audibly identifying a particular transparency or slide by providing an appropriate sound message which is recorded directly on the transparency mount and remains an integral part of the mounted transparency.

With particular attention being given first to the slide projection portion of the illustrated device, it will be noted that such means is generally conventional in nature. The projection lamp 37 is encased in a housing 51 supported on an interior deck 53 which is welded or otherwise suitably secured to the interior walls of the housing 17 and extends lengthwise thereof. A reflector 54 is disposed to the rear of lamp 37, and also adjacent the lamp 37 is a blower fan 55 (FIG. 4) which is powered by a small electric motor 57. A condensing lens 39 is mounted in the forward wall of the lamp enclosure or housing 51, and a second condensing lens 41 is supported on a transverse inner wall 59 having an opening 61 therethrough which is aligned with the transparency-receiving opening in the slide mechanism 33 when the latter is within the housing in its operative position. As indicated previously, the focusing lens 43 is disposed in the axially adjustable tube 45 and in axial alignment with condensing lenses 39 and 41. The projector housing 17 is preferably provided with a supporting foot element 63 at each of the rear corners and an adjustable foot 64 at the front to permit selective elevation of the forward end of the housing and projection tube 45.

Figure 7:
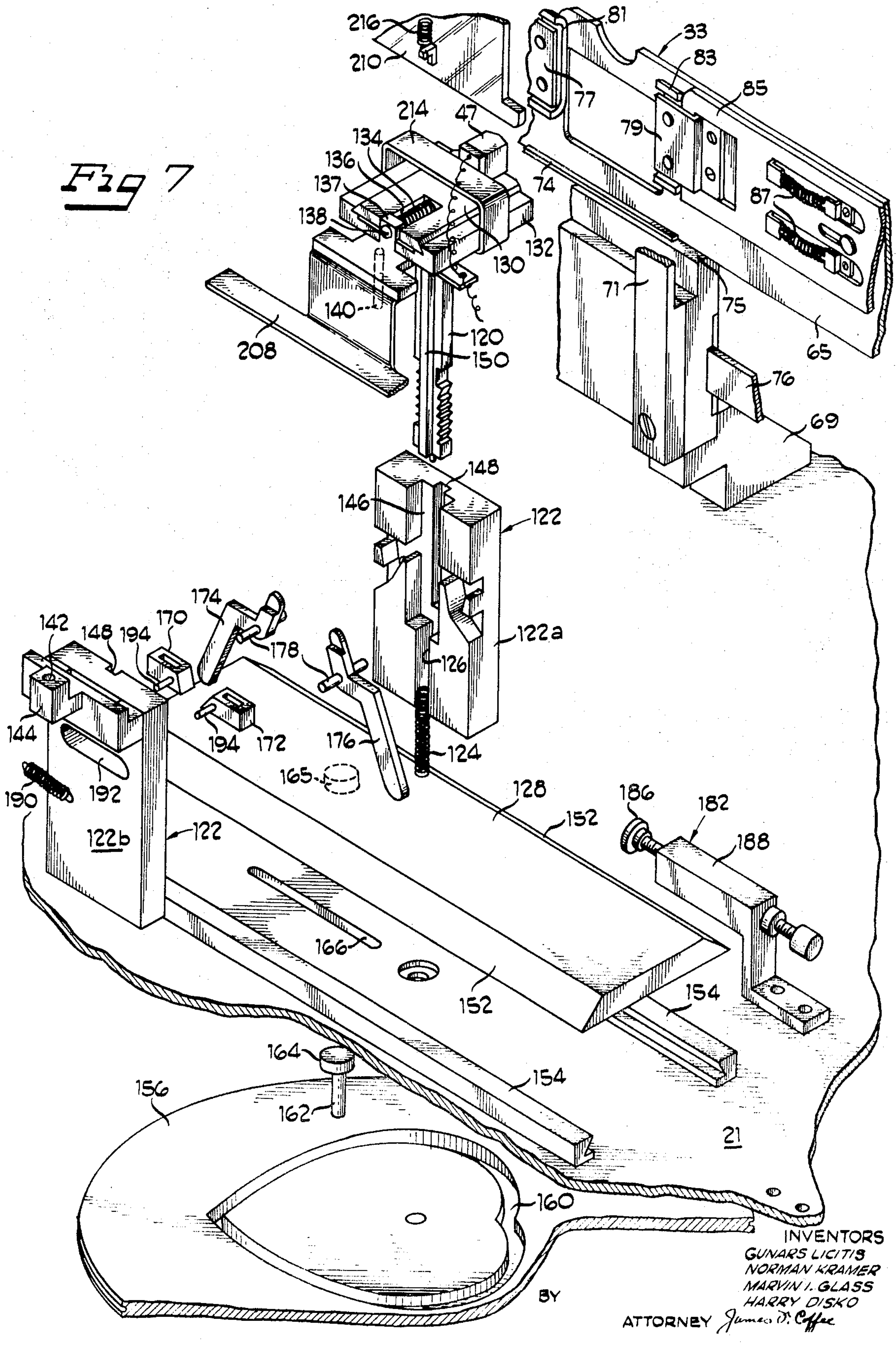
FIG. 7 is an exploded perspective view of the structural components seen particularly in FIG. 6.
Figures 8, 9, 10:
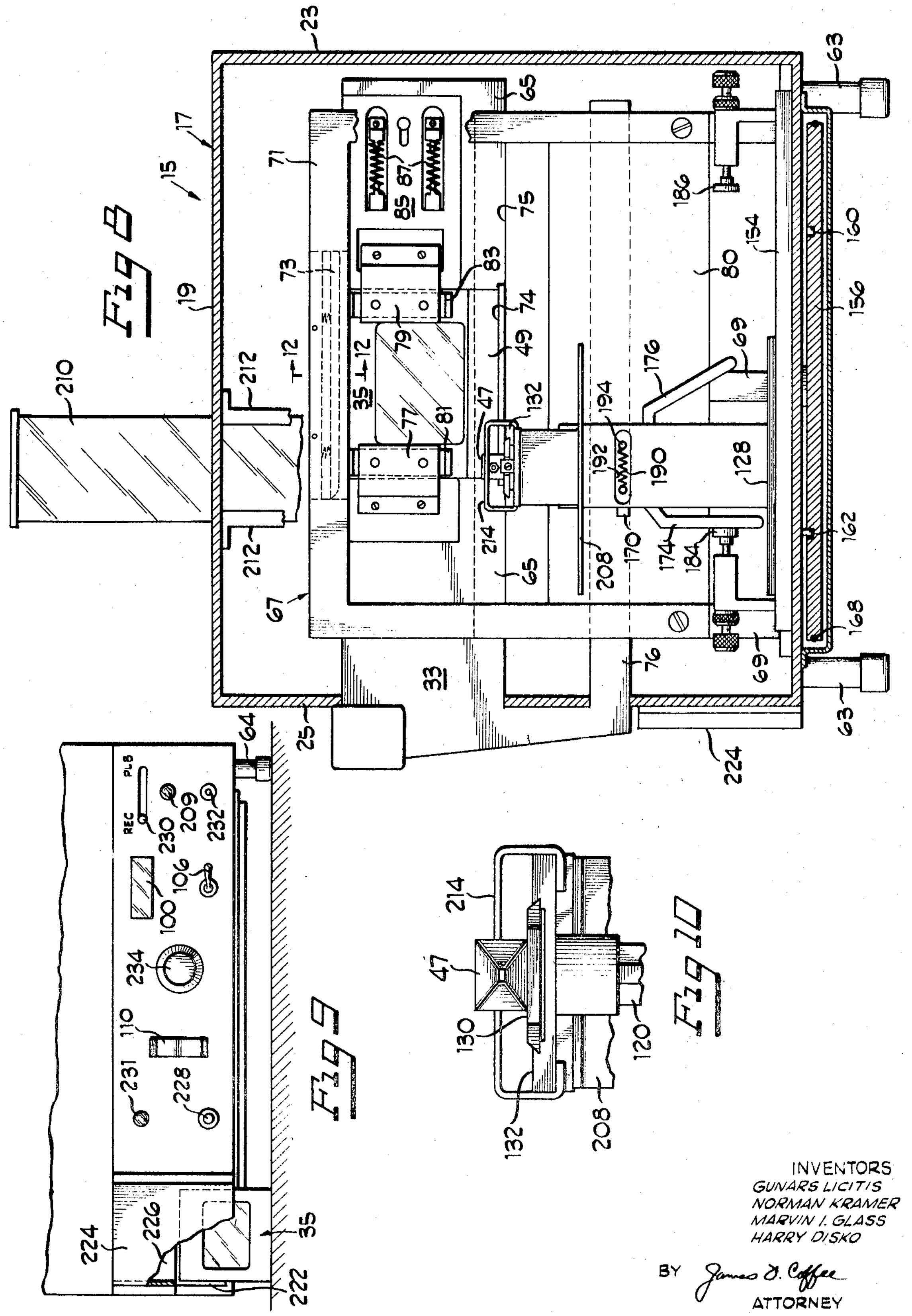
FIG. 8 is a view taken generally along the line 8–8 in FIG. 4, with parts broken away and in section.
FIG. 9 is a fragmentary side elevational view of the projector housing, taken generally along line 9–9 in FIG. 4 and particularly illustrating the control panel for the projector.
FIG. 10 is an enlarged fragmentary front elevational view of the pickup head and its support.

The slide transfer mechanism 33, which is provided for receiving a mounted transparency 35 exteriorly of the housing and moving it into a central location with respect to the axes of the projecting lenses 39, 41 and 43, comprises generally a flat metal plate 65 (FIGS. 4, 5 and 8) which is slidable along a supporting structure 67 mounted transversely within the housing 17. The supporting frame 67 for slide mechanism 33 is secured at its lower portion to three brackets 69 fixed to a lower wall 21 of the projector housing. Slide support frame 67 includes a generally rectangular and relatively narrow framelike piece 71, which supports a spring biased rail 73 centrally of the housing and at a position along the path of movement of the projecting top portion of the transparency mounting 35 when the latter is moved by slide mechanism 33 within the housing 17, . Consequently, as the slide 33 and transparency mounting 35 are moved internally of the housing 17, the upper edge of the transparency mounting engages and is biased downwardly by the spring biased rail 73 to a position of firm engagement with a ledge 74 (FIGS. 7 and 8) on the slide 33. The lower edge of the movable slide plate 65 is supported on a ledge 75 formed on a backing plate 80 for piece 71, and the slide 33 is additionally keyed for guided movement and accurate positioning relative to supporting frame 67 by an integral, lower metal arm 76 which fits into a keyway 78 on frame 67. Conventional means is provided for holding the mounted transparency 35 in a position flat against the slide plate 65, including a pair of laterally spaced-apart plates 77,79 (FIGS. 6 and 7), each supporting a relatively movable, spring-biased shoe 81,83 respectively, which is adapted to press the transparency-mounting frame rearwardly against the elongated plate portion 65 of the slide mechanism 33. The transparency mounting is also centered on the slide 33 by means comprising a movable plate 85 and pair of coil springs 87, each having one end secured to the movable plate 85 and the other end secured to a stationary portion of the slide plate 65 so as to urge the movable plate 85 to the left (FIG. 8) and against the edge of the mount 35.

Thus it is seen that the projector portion of the illustrated device is generally conventional in structure, but slide transport 33 and its mounting frame 67 have been modified somewhat to insure a relatively precise positioning of the transparency 35 within the housing. The reason for this modification will be made apparent hereinafter.

The components and circuitry of the recording and reproducing assembly used in the illustrated device are indicated in block diagram in FIG. 11 and are generally conventional in their form and arrangement. Such components are contained within the housing 17 and are primarily positioned in the forward part of the projector housing in front of the slide support frame 67. Generally, the sound recording and reproducing mechanism selected for use in illustrating the present invention comprises a known form of electronic circuitry including (a) a solid-state three-transistor preamplifier equalizer 90, (b) a four-transistor, direct-coupled, complementary symmetry amplifier 92, (c) a two-transistor, cross-coupled multivibrator bias oscillator 94, and (d) appropriate switching for effecting recording or playback as desired. A microphone 96 is included in the circuit for operation in the "record" mode of the circuit, and a speaker 98 is operative in the "playback" mode of the circuit. Additionally, the circuit includes a record level indicator 100 to guide the operator in making proper use of the signal level when recording a message, and a bulk eraser 102 for erasing a message from the tape 49.

As indicated in FIG. 11, the projector-recorder utilizes conventional house current (110—120 volts) and is provided with a cord and plug 104 for supplying current directly to the fan motor 57, so that fan 55 is operating whenever the unit is plugged into a wall socket or the like. The projection lamp 37 is controlled by a switch 106 (see also FIG. 9). The transport drive motor 108 for effecting movement of recorder head 47 is controlled, in part, by an off-on switch 110, and by a switch 201, to be described later, which also controls the flow of current to the power supply 112 for the recorder. It is believed that the foregoing brief description of the recorder-reproducer components and circuitry is sufficient for a clear understanding of the present invention. Further, it should be recognized that any of several known tape recording assemblies can be utilized or readily adapted for use in the present invention, and that only drive or transport means for head 47 is of particular importance herein insofar as the audio portion of the illustrated device is concerned.

With reference particularly to FIGS. 4—7, a more detailed description will now be given with respect to the recorder head 47 and the mechanism for controlling the movement thereof. It will be noted that head 47 is mounted at the upper end of a vertically extending post 120 which is keyed within a two-piece block 122 and movable vertically with respect thereto. The head-supporting post 120 is biased upwardly by means of a coil compression spring 124 disposed within a vertical channel 127 formed in the block and positioned between the lower end of post 120 and a plate 128 to which block 122 is fixed. More particularly, head 47 is fixedly mounted on s small plate 130 which is slidably keyed to an underlying supporting plate 132 fixed to the upper end of the vertical post 120. A limited amount of fore-and-aft movement of the pickup head 47 and a limited biasing of such movement in the direction of the slide 33 is provided for by means of a compression coil spring 134 disposed in a channel 136 at the rear of plate 130. Spring 134 encircles a screw 138 or the like having a threaded end portion engaging a threaded opening at the inner end of channel 136, and the outer end of the screw is slidably received in a boss 137 projecting upwardly from support plate 132 in fixed relation thereto, with the head of the screw 138 limiting inward travel as it strikes boss 137. The structural arrangement just described provides for adequate pressure of head 47 on tape 49, while still limiting the forward movement of the head so that it does not interfere with the insertion or removal of slide 33 and does not permit the head 47 to strike against metal plate 65 when slide 33 is removed.

The position of pickup head 47 at the top of post 120 is additionally stabilized by a depending pin 140 fixed to block 132 and slidably received in a vertical bore 142 formed in a projecting lug 144 at the upper end of the block 122. In the latter respect, it will be particularly noted in FIG. 7 that block 122 is formed of two complimentary halves 122*a* and 122*b*, with the latter half 122*b* carrying lug 144 and also providing a cover for the post-receiving channel 146 (FIG. 7) formed in the projector a. It will be noted that channel 146 together with block section 122*b* include a pair of oppositely facing grooves or keyways 148 and post 120 is formed with complimentary ribs or key portions 150 on opposite sides and along its length which are adapted to be slidably received in the keyways. The block 122 is secured, as by screws or the like, to the slidable plate member 128. The latter is provided with beveled or inclined edge portions 152 adapted to be slidably received within a pair of rails 154 fixed to the bottom wall 21 of the projector housing.

In order to provide for oscillating movement of the plate 128 and the pickup head 47 supported thereon, there is provided a motor driven cardioid cam wheel or pulley 156 which is drivingly connected to plate 128 so as to provide for lengthwise oscillation of the latter through a predetermined path as the pulley is rotated. More particularly, the pulley 156 is rotatably mounted on the lower side of the bottom wall 21 of the housing as by means of a rivet or pin 158 (FIG. 6) and includes a heart-shaped or cardioid track or groove 160 in its upper surface. A cam follower 162, having its head portion 164 seated in a cylindrical recess 165 (FIG. 7) in the bottom of plate 128 and its depending pin portion extending through an elongated slot 166 in bottom wall 21 and into engagement with the cam groove 160, cooperates with groove 160 to translate the rotary motion of pulley 156 into linear oscillation of supporting plate 128. The rotation of pulley 156 is effected by drive motor 108 (FIG. 5) which is disposed within the lower portion of the projector housing and has its drive shaft connected with pulley 156 through means of a belt 168.

Figure 6:
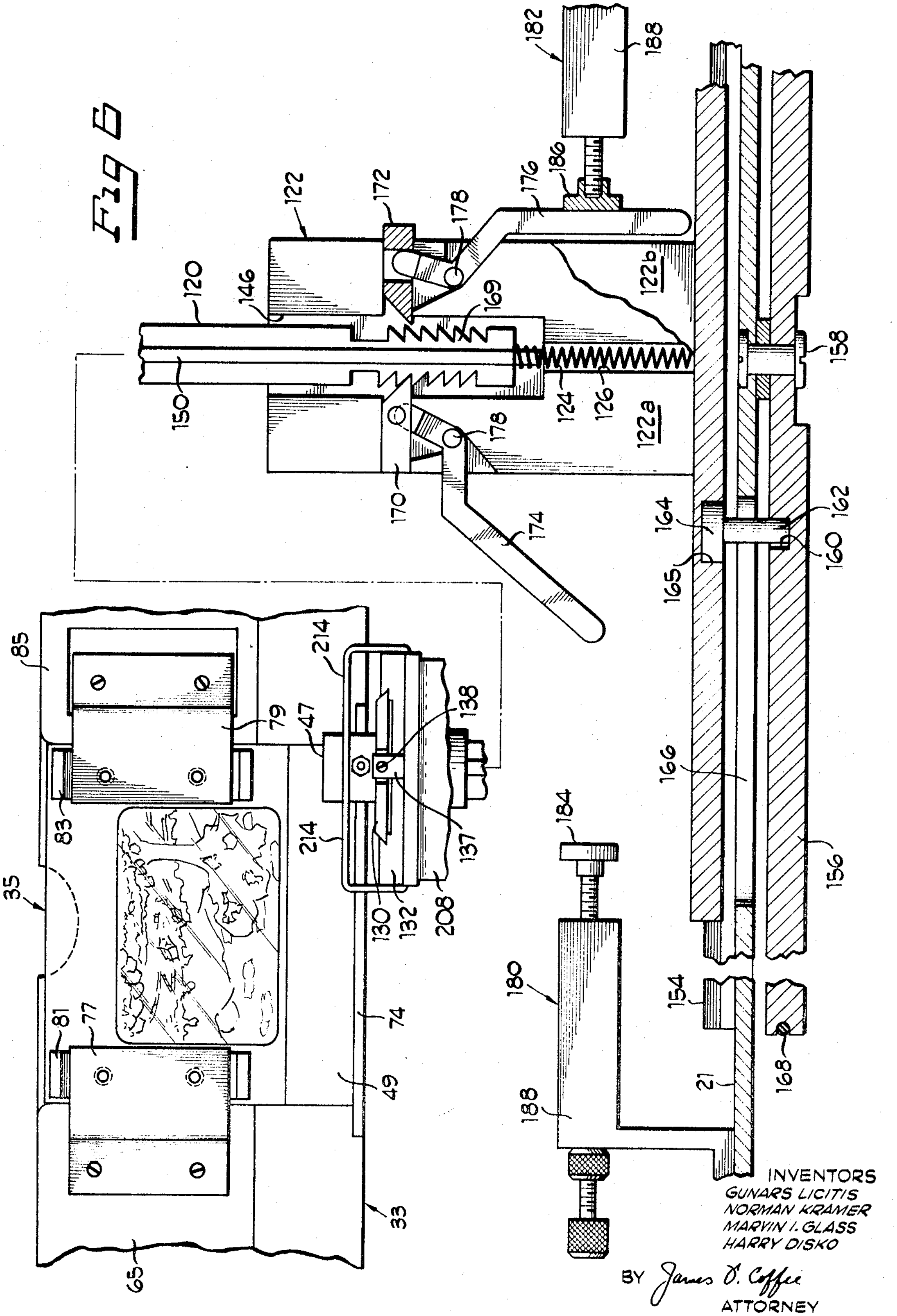
FIG. 6 is an enlarged elevational view taken generally along the line 6–6 in FIG. 5, with parts broken away and in section.

In order to effect vertical movement of pickup head 47 at the end of each lateral stroke provided by movement of plate 128, there is a pawl and rack arrangement at the lower end of the pickup head supporting post 120. With particular reference to FIG. 6, it will be noted that the lower end of post 120 has a series of steps or notches formed on opposite sides thereof and in staggered relation with respect to each other to provide a double rack 169. Further, the block 122 as slidably mounted therein a pair of oppositely facing, aligned pawls 170, 172 which are adapted to operate so as to alternately release the post 120 for upward movement under the biasing action of spring 124, and to halt such upward movement in predetermined increments. Each of the slidable pawls 170, 172 has a lever arm 174 and 176, respectively, associated therewith, and each lever is pivotally supported on the block by a pin 178 for movement of the upper end of the lever through an arc sufficient to effect the desired lateral motion of the associated pawl. Adjacent to each end of the path of movement of the slidable supporting plate 128 there is positioned a stop means, 180, 182, each preferably in the form of a screw 184, 186, respectively, which is fitted within a bracket 188 fixed to the lower wall 21 of the projector housing.

As the plate 128 approaches either end of its stroke, the lever arm on the leading side of block 122 strikes the screw 184 or 186 and thereby moves the associated pawl out of engagement with rack 169 to release post 120 for upward movement. The opposite or trailing lever and its associated pawl are positioned at such time for engagement by the next underlying step on opposite side of rack 169, to thereby halt the post 120 and pickup head 47 at a slightly elevated position with respect to its immediately preceding position of operation. Consequently, the return lateral movement of the block 122 and head 47, which is instantaneous because of the continuous rotation of drive cam 156, causes the pickup head 47 to trace a path, whether recording or reproducing sound, slightly above and parallel to the previous recording path. The pawls 170, 172 are biased toward their innermost positions in block 122 by means of tension coil spring 190 (FIGS. 7 and 8) seated within a transversely slotted opening 192 in block section 122*b* and connected between a pair of pins 194 fixed on the pawls 170, 172. Consequently, as one pawl is withdrawn from engagement with rack 169, by having its associated lever strike against one of the stops 184, 186, the other pawl is in position within channel 146 so as to strike against the next lower serration on the opposite side of rack 169 thereby halt the upward movement of post 120 and pickup head 47.

The above-described pawl and rack arrangement provides an escapement means which insures record or playback operation of the head 47 in only one direction of its continuous sweep of tape 49, so that the head will not run counter to the direction of recording and thereby play a recorded message backwards or record in a reverse direction. For example, it the head 47 is halted in its sweep while moving to the right (FIG. 6), it will continue movement to the right when the drive motor 108 is again actuated by pushing down on bar 210 even though its proper direction for recording or playback may be to the left in the first track of its sweep. However, due to the particular pawl and rack arrangement provided said continued movement to the right will not produce a vertical shift of post 120 even though lever 176 strikes against stop screw 186, since pawl 170 will have been moved into engagement with the uppermost tooth on rack 169 and will hold the post and head 47 in position.

As indicated above, the increments of vertical movement for pickup 47 are determined by the steps or teeth on rack 169 and the total vertical movement possible is the sum of such increments. However, there is also provided electrical switch means for controlling the operation of drive motor 108 so as to limit the travel of head 47 within the recordable space afforded on magnetic strip 49. The latter means is in the form of a microswitch 201 (FIG. 11) controlled by a lever 204 (FIG. 5) disposed with its free end in the path of a bracket 208 carried on head supporting plate 132, and a drive-motor-activating bar 210 extending upwardly through the top wall of the projector housing. The bar 210 is guidedly positioned with respect to a pair of channel members 212 for vertical movement relative to a position of engagement with a bridge 214 fixed to the pickup support plate 132, and bar 210 is biased toward its uppermost position by a tension coil spring 216. When bar 210 is fully depressed, it pushes bridge 214 and post 120 downwardly to a position wherein pawl 170 (FIG. 6) engages the uppermost tooth on rack 169 and holds the post 120 in its fully depressed position. This downward movement of the pickup support also causes bracket 208 to permit lever 204 to fall and initiate operation of switch 201 to actuate the drive motor when main switch 110 is on. Lever 206 also drops with bracket 208 to permit switch 202 to close and turn on signal light 209 in the event the system is in the record mode, as determined by a separate switch in the circuit which is not shown. Briefly, switches 201 and 202 are normally closed and levers 204 and 206 act to open these switches in sequence as head 47 and bracket 208 moves upwardly. With motor 108 operating, head 47 then proceeds to either record or playback, in accordance with the setting of button 230 on the control panel, as it traverses the magnetic tape 49. As the head 47 reaches its uppermost track through the operation of rack 169 and pawls 170, 172, the bracket 208 lifts the second lever 206 and opens switch 202 to shut off light 209 and warn the operator that he has a brief period, about 2 seconds, in which to complete his message. As the head 47 reaches the end of its path on such uppermost track, bracket 208 then lifts lever 204 to open switch 201 and halt the operation of the drive motor 108.

The above described recording mechanism is especially adapted for use in conjunction with a conventional transparency mounting. Such mountings, as provided in the processing of transparency film, and as sold in connection with scenic and educational slides, are approximately 2×2 inches. The mounting or frame portion is usually a laminated paper or cardboard structure with the marginal edge portions of the slide held between the laminations. The cardboard frame or mounting provides marginal surface portions surrounding the transparency, with the upper and lower marginal surfaces having a depth of approximately one-half inch in a typical mounting for the 35 m.m. slide. In the present invention at least one of these marginal areas is utilized as a backing for the strip of magnetic tape indicated at 49 in FIGS. 2 and 3, or such area may be coated with magnetically recordable material. The strip of magnetic tape is attached to the cardboard or paper surface by suitable adhesive, and preferably a thin resilient backing strip 220 of paper, cloth or the like is placed between the magnetic tape and the cardboard frame, in order to provide resiliency for the tape necessary to achieve proper recording characteristics. The backing strip 220 can be eliminated if the mounting frame is provided with a relatively yieldable and soft lamination on at least one face in lieu of the calendared paper normally used on such mountings. Additional ways of achieving the desired result will be readily apparent to those skilled in the art. For example, the entire surface laminate of the slide mounting 35 can be made of a suitable, resilient material and the magnetically recordable strip can be coated directly on such laminate. In order to accommodate the recording of sound messages on existing slides, a suitably backed magnetic tape can be sold in rolls together with a suitable adhesive, or the backing can be provided with a pressure-sensitive adhesive and covered with a removable cover strip. The user can cut such tape to a length conforming to the width of the frame mounting and apply it to the individual mountings. Although tape 49 is shown as applied to the lower margin or surface on one side of the slide mounting, it will be apparent that other surface areas on the mounting can be utilized.

In order to provide for correction and deletion of the sound message recorded on tape 49, the illustrated audio-slide projector also includes a conventional bulk eraser 102 incorporated in the rear of the projector on the control panel. The bulk eraser 102 includes an electromagnet within the housing 17 in facing relation to an opening 222 (FIG. 9) in the control panel. In covering relation to opening 222 is a plate or bracket 224 adapted to receive a transparency slide in a slot 226 (FIG. 4) formed by the bracket 224 at its upper edge. The eraser 102 is activated by pressing a button 228 on the control panel, and there is also provided a signal light 231 which indicates that the eraser is in operation. In order to eliminate or erase a sound message from a slide, the user presses button 228 and drops the slide into the slot 226 with the tape 49 disposed at the top of the slide. As the slide is manually moved laterally out of the path of the electromagnet any sound recording thereon is erased. Tape 49 is then in condition for recording another message thereon.

In summary, the operation of the described sound-slide projector is as follows. Slide transport mechanism 33 is withdrawn from the projector housing 17 and a slide 35 is placed in the slide aperture portion thereof, with the magnetic tape portion 49 of the slide mounting facing forwardly, i.e. in the direction of projection tube 45. Slide mechanism 33 is then inserted through the slotted opening 31 in the side of the projector housing, until its movement is halted, as by striking against a stop. As the slide transporter 33 moves into its fully inserted position, the spring-biased shoe or plate 73 presses downwardly against the upper edge of the transparency mounting to insure proper position of the magnetic tape portion 49 with respect to the pickup head 47.

When the projector cord 104 is plugged into a wall socket or the like, the motor 57 and blower 55 are automatically turned on. The projection lamp 37 is then turned on through use of the switch 106 and the image on the transparency will then be projected onto a viewing screen or the like.

If the tape portion 49 is blank and it is desired to record an appropriate message thereon, switch 110 is moved to "on" and mode button 230 is moved to the "record" position. The microphone connector is inserted in the jack 232 and the volume control knob 234 is adjusted while speaking until the recording level meter 100 registers approximately in the center of the dial. The mechanism is now ready for recording, subject only to effecting movement of the recording head 47 and speaking into the microphone 96. The movement of the record head 47 is initiated by the activator bar 210 being moved to its down position. This actuates the drive motor switch 201 to effect rotation of the cam wheel 156 to thereby provide the above described oscillating and vertical movement of the pickup head 47. There is also preferably provided a record indicator light 109 which becomes lit only in record mode with the operation of the activator bar and remains lighted until the pickup head 47 has completed all but the last track of its lateral sweep. Consequently, when the light goes off the operator knows that he has a very limited time in which to complete his message, before the drive motor 108 stops.

In the event tape 49 has been previously recorded the slide is positioned for viewing, as described above, and switch 230 is placed in the playback position. When the activator bar 210 is depressed, the pickup head 47 the moves back and forth across the tape to reproduce the sound message thereon. In the latter case, of course, the speaker 98 is included in the operating circuit.

In the described embodiment, a microgap pickup head has been used to produce 13 parallel tracks on a tape one-half inch wide, each track having a width of 0.024 inch and having a center to center spacing of 0.036 inches. The microgap head allows slow speed of operation with adequate frequency response, and with the 13 tracks approximately 25 seconds of recording is attainable.

Although shown and described with respect to particular mechanism, it will be apparent that various modifications might be made without departing from the principles of this invention.

What we claim is:

1. An audio-slide projector for use with individually mounted transparencies having a magnetic recording surface on the mounting portion surrounding the transparency, said projector comprising a housing, a slide mechanism carried on said housing and adapted to move a mounted transparency along a first path between a position externally of the housing and a position within the housing, said slide mechanism having means defining an opening therein to receive a transparency and including spring-biased means for automatically centering the transparency relative to the opening, means for projecting an image of the transparency on to a viewing surface, and sound-reproducing mechanism including a pickup head within said housing which is engageable with the recording surface portion of a slide inserted therein and movable to trace a path on the recording surface without interfacing with the projection of the transparency, said pickup head being supported on a carrier which is movable through a second path substantially parallel to said first path of said slide mechanism, means operably connected with said carrier to effect continuous oscillation thereof back and forth along a predetermined length of said second path including a cardioid cam drivingly connected with said carrier, and an electric motor drivingly connected with said cam to rotate the cam to effect oscillation of said carrier at a constant speed, means supporting said pickup head on said carrier for incremental movement relative to said carrier and at right angles to said second path, and elevating means including stop means at opposite ends of said second path, which stop means are positioned for cooperative engagement with said support means for said pickup head so that said elevating means effect movement of said pickup head through an increment each time the carrier reaches one end of said predetermined length of said second path.

2. An audio-slide projector as set forth in claim 1 wherein said cardioid cam is in the form of a groove on a face of a drive pulley which is closely parallel to said carrier, and a pin is secured to said carrier and projects into said cardioid cam groove to provide a connecting means there between for oscillating said carrier in response to rotation of said drive pulley.